(12) United States Patent
Grenet

(10) Patent No.: US 11,982,549 B2
(45) Date of Patent: May 14, 2024

(54) POSITION ENCODER

(71) Applicant: CSEM Centre Suisse d'Electronique et de Microtechnique SA—Recherche et Développement, Neuchâtel (CH)

(72) Inventor: Eric Grenet, Neuchâtel (CH)

(73) Assignee: CSEM CENTRE SUISSE D'ELECTRONIQUE ET DE MICROTECHNIQUE SA—RECHERCHE ET DEVELOPPEMENT, Neuchatel (CH)

( * ) Notice: Subject to any disclaimer, the term of this patent is extended or adjusted under 35 U.S.C. 154(b) by 117 days.

(21) Appl. No.: 16/951,221

(22) Filed: Nov. 18, 2020

(65) Prior Publication Data

US 2021/0148733 A1    May 20, 2021

(30) Foreign Application Priority Data

Nov. 19, 2019   (EP) .................................... 19210013

(51) Int. Cl.
| | |
|---|---|
| *G01D 5/24* | (2006.01) |
| *G01D 5/249* | (2006.01) |
| *G01D 5/38* | (2006.01) |

(52) U.S. Cl.
CPC ............. *G01D 5/2497* (2013.01); *G01D 5/38* (2013.01)

(58) Field of Classification Search
CPC .............................. G01D 5/2497; G01D 5/38
See application file for complete search history.

(56) References Cited

U.S. PATENT DOCUMENTS

| | | | |
|---|---|---|---|
| 5,563,408 A | 10/1996 | Matsumoto et al. | |
| 9,658,060 B2 | 5/2017 | Molnar et al. | |
| 2004/0007664 A1* | 1/2004 | Mitchell | ............ G01D 5/34715 |
| | | | 250/237 G |
| 2015/0260663 A1 | 9/2015 | Yun et al. | |

FOREIGN PATENT DOCUMENTS

| | | |
|---|---|---|
| EP | 2546612 A2 | 1/2013 |
| EP | 2916104 A1 | 9/2015 |
| WO | 03/021194 A2 | 3/2003 |
| WO | 2012/007561 A2 | 1/2012 |
| WO | 2018/191753 A1 | 10/2018 |

OTHER PUBLICATIONS

Search Report issued in European Patent Application No. EP19210013.9 dated May 12, 2020.
Wikipedia page on Optical filter, printed: Aug. 15, 2023, https://en.wikipedia.org/wiki/Optical_filter.

* cited by examiner

*Primary Examiner* — Tony Ko
(74) *Attorney, Agent, or Firm* — Pearne & Gordon LLP

(57) ABSTRACT

A device for determining the position of a light source, including an optical mask with a periodic pattern casting a shadow on an imager placed at a multiple of the Talbot distance or at a fraction of the Talbot distance.

18 Claims, 2 Drawing Sheets

POSITION ENCODER

FIELD OF THE INVENTION

The present invention concerns an absolute optical encoder for positioning a mobile in space, or on a plane, or on a line. Embodiments of the invention relate to the positioning of a mobile light source relative to an optical detector and, conversely, to the positioning of a mobile optical device relative to a light source. Notable but not exclusive applications of the invention include computer peripherals, virtual reality interface devices, absolute positioning of tools and probes for mechanical, surgical, and inspection procedures, and many other.

DESCRIPTION OF RELATED ART

Optical positioning devices are well known in the art and are used in several technical domains. Linear or angular optical encoders, such as for example those used in callipers, coordinate measuring machines and high precision machine tools are disclosed in many publications, among which U.S. Pat. No. 5,563,408 is but an example, and provide the precise position of an optical device (often called a "read head") relative to a rule carrying a precise repeating pattern.

Position encoders can be incremental or absolute. An absolute encoder provides the exact position of the target that it is measuring without reference to prior states, while incremental encoders provide series of pulses as the target changes position, and these must be counted to obtain the position relative to a starting reference point. The present invention encompasses both varieties of encoders.

More elaborate encoders can determine a two-dimensional position of an optical detector or of a light source. WO2012007561, among others, discloses a measurement system in which a light source is directed to a planar pattern, comprising a bidimensional mask or a micro lens array, and processor determine the elevation of the light source based on a shadow cast by the pattern on an imaging device. The resolution of such devices can be remarkable, but it is in any case limited by optical effects. In particular, the pitch of the pattern cannot be reduced at will, because of diffraction effects and the separation between the mask and the imager cannot be too large, for the same reasons.

The "Talbot effect" is a self-imaging phenomenon that occurs in the near-field region adjacent to a diffraction grating: The image of the grating is repeated at regular distances. The repetition distance is called the Talbot distance and is expressed by the formula $Z_T=2a^2/\lambda$ where a denotes the grating's period and $\lambda$ the wavelength. Furthermore, at half-integer multiples of the Talbot distance, identical images also occur, but shifted by half the period of the grating, and sub-images of fractional size are found at fractions of the Talbot distance.

Applications of Talbot imaging in spectroscopy are common. In the domain of position encoding, WO03021194 discloses a linear optical encoder in which the position between the read head and an optical linear rule is chosen in consideration of the Talbot distance. In these publications, generally, the grating is regular and one-dimensional; the light crosses the grating orthogonally, or with a small incidence angle.

An aim of the present invention is to improve the resolution and the precision of known optical positioning devices.

BRIEF SUMMARY OF THE INVENTION

According to the invention, these aims are achieved by the object of the annexed claims, and namely by a positioning device comprising: a light source, having a component with a given wavelength, a mask carrying a pattern having a given period, arranged to cast an image of the pattern on an imager placed at a distance from the mask, a logic circuit connected to the imager for acquiring the image of the pattern cast on the imager, and arranged to determine a position of the light source based on the acquired image, wherein this distance is equal or a multiple or a fraction of the Talbot length arising from the wavelength of the light source and from the period of the pattern. The "lever effect" provided by a distance between the mask and the imager, equal or a multiple or a fraction of the Talbot length, allows to improve the resolution and/or the precision of optical positioning device according to the invention.

In a variant, the fraction of the Talbot length is a rational number (belonging to the set Q or to a sub-set of the set Q). The fraction of the Talbot length can be a proper fraction, i.e. a fraction whose numerator is smaller than its denominator, or an improper, i.e. a fraction whose numerator is equal or greater than its denominator. In a variant, the numerator of the fraction is an integer number equal or lower than 20, preferably equal or inferior than 10. In a variant, the denominator of the fraction can be an integer number equal or lower than 20, preferably equal or inferior than 10.

In this context, if the distance between the mask and the imager is equal to a specific fraction of the Talbot length, then the brightness of the produced pattern is measurable.

In general, the distance between the mask and the imager of the positioning device according to the invention is greater than the distance between the mask and imager of a known positioning device, not exploiting the Talbot effect. Increasing such a distance is not an option considered in the state of the art, as this increasing would degrade the signal due to interferences (diffraction). However, the applicant surprisingly discovered that the use of a pattern having a given period and of a distance equal or a multiple or a fraction of the Talbot length turns this drawback into an advantage: the sensitivity of the positioning device according to the invention is increased with regard to known positioning devices not exploiting the Talbot effect.

The measurement resolution can also be enhanced by an additional multiplicative sub-periodicity effect: placing the pattern having a given period at a given Talbot distance fraction, where sub-periods are observed, provides an enhancement of the precision by the period multiplicative factor, the signal precision being relative to the observed period.

Both of these enhancements (lever-arm and sub-periodicity) can be combined, and their effects are multiplicative, allowing in such conditions to increase the resolution of the positioning device by more than two orders of magnitude, leading to the detection of displacements of the light source that are not perceptible with known configurations.

Finally, the positioning device according to the invention allows the use of very "small" grating periods to achieve even higher precision. In this context, a period is small if it is less than 100 µm, in particular less than 50 µm, in one example less than 25 µm. Using such small periods was previously not possible due to the substantial noise from diffraction. This is now resolved by placing the regular grating at a specific Talbot distance as this provides a clean Talbot image without interferences.

In a variant, an absolute code can be designed in the regular pattern (for example with missing holes) for the realization of high-resolution absolute encoders based on Talbot effect.

The positioning device according to the invention is implementable in many situations, providing higher precision, higher resolution and potentially higher accuracy.

Dependent claims introduce optional and useful features such as: the fact that the mask and the imager are bidimensional and/or placed on parallel planes; the light source and the imager placed on different planes; the light source being reflected light; the mask between the light source and the imager; the mask and the imager in a fixed spatial relationship, possibly on opposite parallel faces of a transparent body; the mask placed at the distance equal or a multiple or a fraction of the Talbot length, wherein sub-periods of the period of the pattern carried by the mask are observed; an absolute positioning code that the logic circuit can recognize and use to determine an absolute position of the source; an imager smaller than the image of the pattern that records, for all possible positions of the light source a sub-region of the image cast by the pattern containing sufficient information for determining the absolute position of the light source; the absolute code consisting in missing or altered features in the repeating arrangement of the mask.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
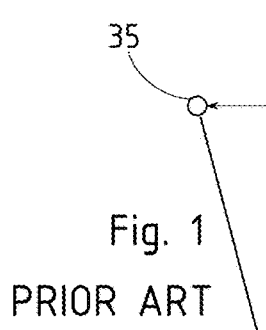
FIGS. 1 and 2 illustrate geometrically an effect determining the response and the performances of the optical encoders of the invention.
Figure 1:
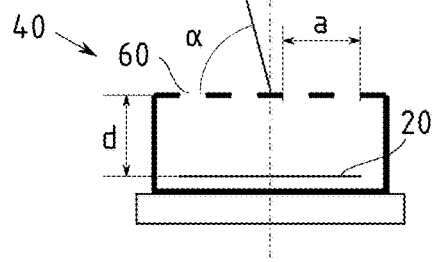

FIG. 1 shows schematically a measurement system as disclosed in WO2012007561. The system determines the position, or the elevation angle $\alpha$ or the zenith angle D of the light source 35 to the detector 40. The light source 35 could be an LED, a laser source or any suitable light source. The following, description treats the source 35 as a monochromatic one. While sensible, this is not a necessary feature: the invention could operate with a white or broad-spectrum source by inserting a suitable spectral filter in the light path. The source 35 could also be a source of reflected light; in a variant, the light is reflected by an object whose position is to be determined.

The detector includes a mask 60 carrying a pattern with a period 'a', and casts a shadow on the imager 20. The mask 60 could be a grating with a repeating arrangement of opaque and transparent zones, a phase grating, an arrangement of micro-lenses or any arrangement of optical features that produce a recognizable shadow, that is a recognizable distribution of illumination, on the imager 20.

The imager 20, for example a CMOS image sensor, records the spatial distribution of illumination at the distance 'd' beyond the mask 60 from which the angle $\alpha$ can be computed. It must be understood that, although the FIG. 1 represents a simplified one-dimensional mask, the mask 60 and the imager 20 can in fact be bidimensional, and the detector 40 can locate the source in a two-dimensional representation, for example by computing the altitude and the azimuth angles of the source.

Figure 2:
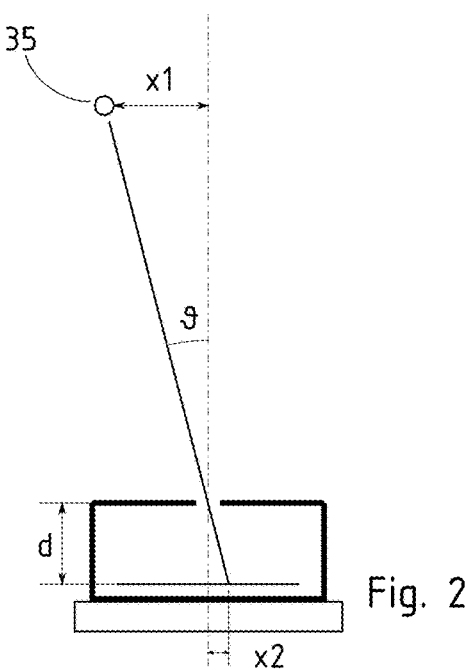

The resolution of the measuring system 40 is determined by the ability of the imager 20 to measure a shift in the shadow of the mask 60. As shown in FIG. 2, the relation is the same as in a pinhole camera: the shift of the shadow is geometrically related to the zenith angle D and the distance 'd' between the mask and the imager by $x_2 = d \cdot \sin \theta$.

If the mask 60 were strictly periodical, the light distribution seen by the detector 20 would repeat identically at $x_2 = n \cdot a$ for each n integer. The mask can include an absolute code superimposed to the periodic pattern that allows the absolute determination of the mask position.

This geometrical description disregards the diffraction effects that blur the shadow pattern and reduce its visibility. The effect of diffraction is more severe for high 'd' and small 'a' therefore, the resolution of the known systems cannot be improved by a simple choice of a long throw distance d with a very fine grating a.

Figure 3:
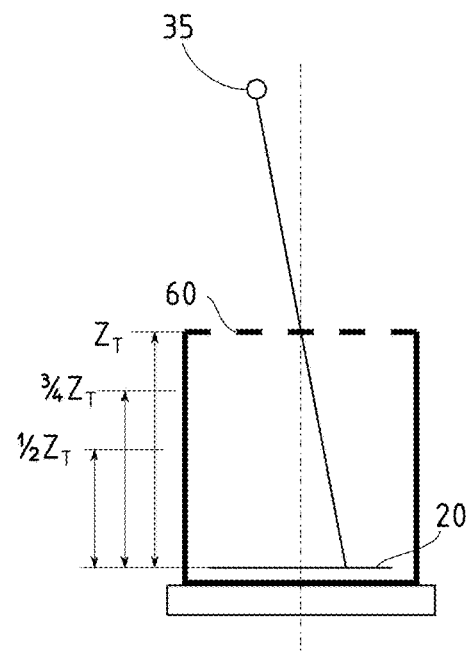
FIG. 3 illustrates schematically a position encoder with an improved resolution thanks to the increase of the lever arm effect.

FIG. 3 shows how the present invention exploits the Talbot effect to overcome the above limitations. The distance between the imager 20 and the mask 60 is equal or a multiple or a fraction of the Talbot length $Z_T = 2a^2/\lambda$ arising from the wavelength $\lambda$ of the light source and the period a of the pattern. Thanks to the Talbot effect, the illumination pattern on the imager is an image of the mask, without the blurring effect of the diffraction. The inventors have realized that, unexpectedly, this advantage is retained in this application despite the high values of the incidence angle $\theta$ (up to and beyond 60°) and the fact that the patterns, having an absolute code superimposed, are not strictly periodic.

In an example, a position sensor with the structure of FIG. 3 had an 850 nm light source and a 100 μm periodic grating. These dimensions yield a Talbot length $Z_T$=23.5 mm. Placing the pattern at the Talbot distance $Z_T$ allows the imaging of a pattern shadow without any diffraction effect. At 1 m distance, a 100 μm lateral displacement of the light source induces a displacement of the shadow signal of 100 nm in the standard configuration and 2.4 μm in the Talbot configuration, increasing the detection resolution by a factor of 24. Moreover, placing the pattern at twice the Talbot distance ($2Z_T$) provides an increase by a factor close to 50 whilst maintaining a good image quality. This lever-arm effect has been measured for various multiples of the half-Talbot distance, the enhanced measurements matching with the theory.

The inventors have experimentally acquired sharp images of the pattern at distances d=0.5 $Z_T$, d=$Z_T$, d=1.5 $Z_T$, d=2 $Z_T$. The quality of the image was better than that obtained at non-Talbot arbitrary distances (d=0.9 mm), while increasing the lever arm effect and thus the resolution. In a further advantageous variant of the invention the distance d is set to a regular fraction of the Talbot distance. At these positions, the imager receives a scaled-down image of the grating. For example, at d=¼ $Z_T$ and at d=¾ $Z_T$, the Talbot image has a period that is one half of the period a of the grating 60 or, rather, the spatial frequency of the illumination field is doubled. At d=⅝ $Z_T$ the spatial frequency is tripled, and so on. This can be advantageous because, when the image acquired by the imager 20 is analysed, the precision of the measurement is relative to the spatial frequency. Moreover, the scaled-down image could be captured, advantageously, by a smaller detector and/or by a detector with smaller pixels. One may say that placing the imager at a Talbot-fractional distance is akin to multiplying the resolution of the grating 60, without diffraction effects.

Figure 4:
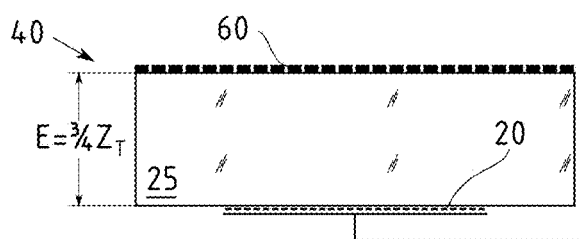
FIG. 4 illustrates a variant of the invention including a transparent plate or an optical filter plate or an air gap between the mask and the imager.

FIG. 4 illustrates a possible compact implementation of the invention in which the distance between the mask and the imager is set by a glass plate or an optical filter plate 25. One may, for example choose a near-infrared source at $\lambda$=940 nm, a mask with a period a=50 µm, and choose the thickness of the plate 25 such that the imager is at a distance of d=¾ $Z_T$=3a²/(2$\lambda$)=3.99 mm.

Without choosing a distance that is related to the Talbot length, fine pitch gratings are not normally advantageous, because of the diffraction smearing of the image. In this embodiment of the invention, the large distance E and the mask's fine pitch give excellent resolution to this realization. Another advantage is that the space between the mask 60 and the image 20 is homogeneous with no changes of the refractive indexes, which the inventors have found to be advantageous. The logic circuit 50 acquires and analyses the illumination pattern present at the imager 20 and determines the position of the light source, using suitable interpolation algorithms.

The detector has been successfully tested on large incident angles ($\theta$>60°) with different mask patterns, wavelengths, and distances.

Figure 5:
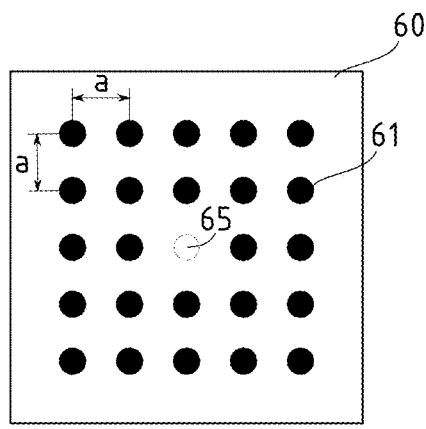
FIGS. 5 and 6 illustrate a part of a mask with a missing feature, and one of the corresponding Talbot images.

The mask 60 preferably includes an absolute code superimposed to the periodic repetition with period a to enable the determination of an absolute position. The absolute code always implies some deviation from periodicity, for example a missing feature or an altered feature in the repeating arrangement of the mask. The inventors have found that, the position of the missing or altered fracture can be detected in Talbot image and at least in many sub-images. FIG. 5 shows a fraction of a mask 60 with a repeating arrangement of opaque (or transparent) features 61 and one missing feature at position 65, which could be taken as a bit of information in an absolute position code.

Figure 6:
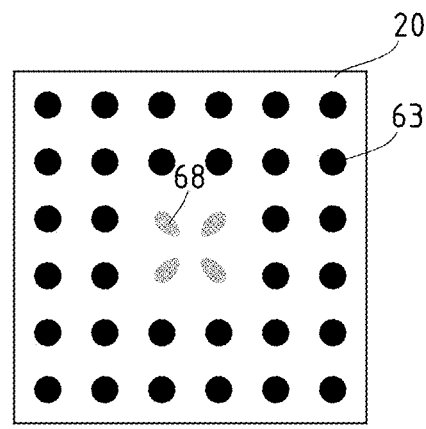

FIG. 6 is the corresponding half-Talbot image, at a distance d=a²/$\lambda$ where the shadows 63 have the same pitch a of the original pattern but are shifted by half a period. The omitted feature 65 shows as four deformed and weaker shadows 68 in the image and can be readily detected.

Figure 7:
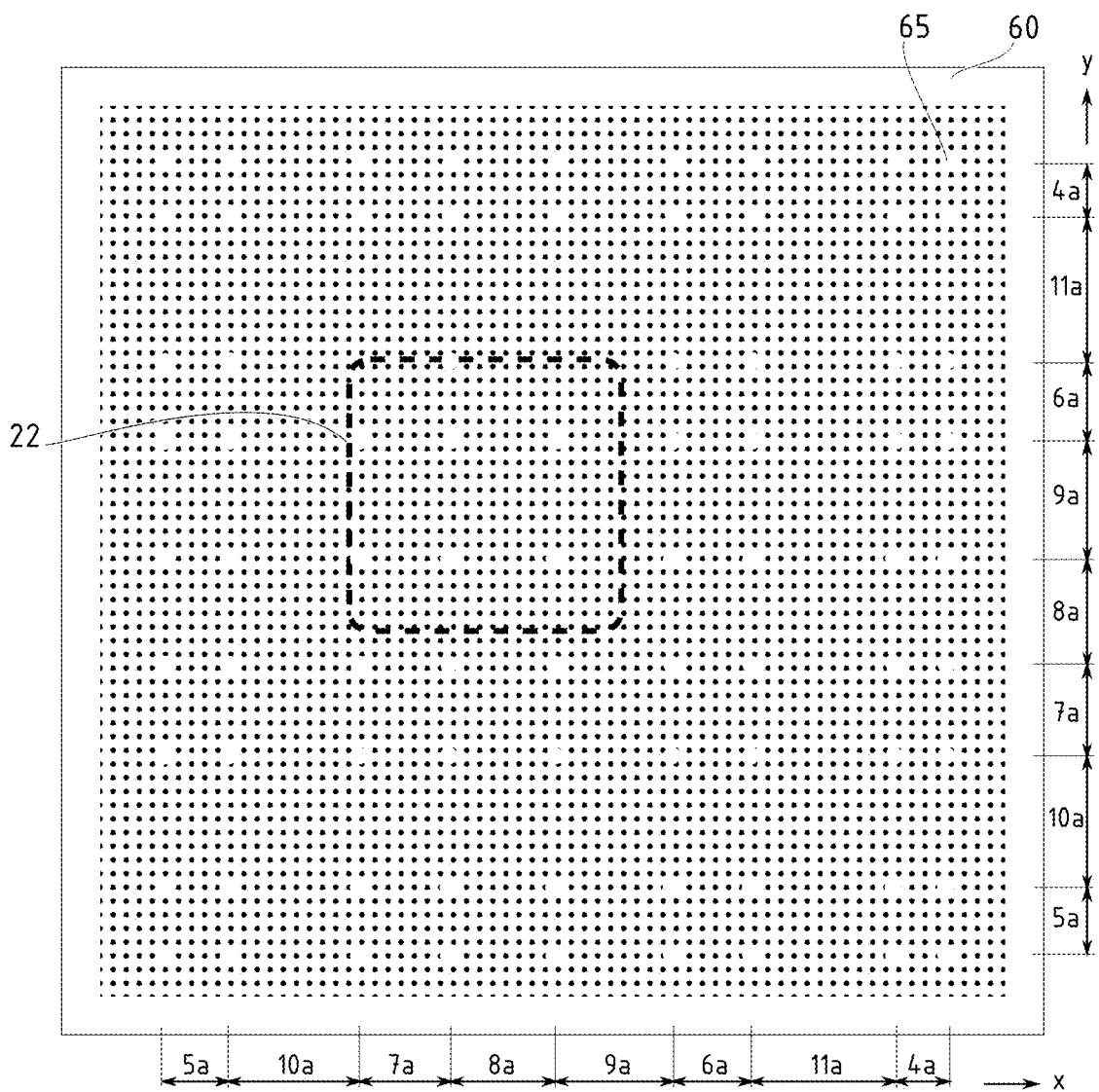
FIG. 7 illustrates a possible absolute spatial code based on the strategic omission of certain periodic features.

FIG. 7 shows a possible implementation of an absolute positioning code in the mask 60. Since the imager 20 is smaller than the mask and the incidence angle is not zero, the imager 20 sees only a sub-region 22 of the whole pattern. The absolute code consists in an arrangement of missing features 65 that for all possible positions of the light source the sub-region recorded by the imager contains enough information for determining the absolute position of the light source. In this example—which is not the only possible— the absolute code consists in pairs of missing holes along the "x" and "y" directions, and each pair has a unique distance. The absolute position information is encoded in the distance between two missing features, and the spacing between missing features is chosen such that, for any possible position of the light source, the acquired image includes at least one—or more—pair of missing feature along the "x" direction and at least one—or more—pair of missing features along the "y" direction.

The invention claimed is:
1. A positioning device comprising:
a light source, having a component with a given wavelength,
a mask carrying a pattern having a given period, arranged to cast an image of the pattern on,
an imager placed at a distance from the mask, and
a logic circuit connected to the imager for acquiring the image of the pattern cast on the imager, and arranged to determine a position of the light source based on the acquired image, wherein
the positioning device is configured to determine a position of the light source,
the distance is equal or a multiple or a fraction of the Talbot length arising from the wavelength of the light source and from the period of the pattern,
the distance is configured to provide a lever effect,
the mask and the imager are in a fixed spatial relationship, and
the mask and the imager are disposed on opposite parallel faces of an optical filter plate.

2. The positioning device of claim 1, wherein the mask and the imager are placed on parallel planes.

3. The positioning device of claim 1, wherein the mask and the imager are bidimensional.

4. The positioning device of claim 1, wherein the light source is a source of reflected light.

5. The positioning device of claim 1, wherein the light source and the imager are placed on different planes and/or the mask is between the light source and the imager.

6. The positioning device of claim 1, wherein said mask is placed at said distance equal or a multiple or a fraction of the Talbot length, wherein sub-periods of the period of the pattern carried by said mask are observed.

7. The positioning device of claim 1, wherein the distance is a multiple of the Talbot length.

8. The positioning device of claim 1, wherein the distance is 1.5 time or 2 times the Talbot length.

9. The positioning device of claim 1, wherein the distance is a fraction of the Talbot length.

10. The positioning device of claim 1, wherein the distance is equal to ½, ¾, or ⅝ of the Talbot length.

11. A positioning device comprising:
a light source, having a component with a given wavelength,
a mask carrying a pattern having a given period, arranged to cast an image of the pattern on,
an imager placed at a distance from the mask, and
a logic circuit connected to the imager for acquiring the image of the pattern cast on the imager, and arranged to determine a position of the light source based on the acquired image, wherein
the positioning device is configured to determine a position of the light source,
the distance is equal or a multiple or a fraction of the Talbot length arising from the wavelength of the light source and from the period of the pattern,
the distance is configured to provide a lever effect, and
the mask has an absolute positioning code, the logic circuit being arranged to recognize the absolute positioning code and determine an absolute position of the light source based on the absolute positioning code.

12. The positioning device of claim 11, wherein the imager is smaller than the image of the pattern such that, for all possible positions of the light source, the imager records a sub-region of the image cast by the pattern and the absolute positioning code is such that the sub-region recorded by the imager contains sufficient information for determining the absolute position of the light source.

13. The positioning device of claim 11, wherein the pattern of the mask is a repeating bidimensional arrangement of optical features and the absolute positioning code consists in missing or altered features in the repeating arrangement.

14. The positioning device of claim 11, wherein the absolute positioning code comprises missing or altered features of the mask.

15. The positioning device of claim 11, wherein the absolute positioning code comprises a repeating arrangement of opaque or transparent features of the mask and missing or altered features that deviate from a periodicity of the repeating arrangement.

16. The positioning device of claim 15 wherein the missing or altered features are holes in the mask arranged as pairs in x and y directions.

17. The positioning device of claim 15, wherein spacing between the missing or altered features is configured such that the acquired image includes at least one pair of missing features along an x direction and at least one pair of missing features along a y direction.

18. The positioning device of claim 15, wherein the distance between two missing features is configured to encode an absolute position information, and a spacing between the two missing features is configured that the acquired image includes at least one pair of missing features along the x direction and at least one pair of missing features along the y direction for any possible position of the light source.

* * * * *